US007628833B2

(12) United States Patent
Oh

(10) Patent No.: US 7,628,833 B2
(45) Date of Patent: Dec. 8, 2009

(54) MULTI-CYCLONE DUST SEPARATING APPARATUS

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 488 days.

(21) Appl. No.: 11/490,661

(22) Filed: Jul. 21, 2006

(65) Prior Publication Data

US 2007/0095030 A1 May 3, 2007

(30) Foreign Application Priority Data

Oct. 28, 2005 (KR) ...................... 10-2005-0102613

(51) Int. Cl.
*B01D 45/12* (2006.01)

(52) U.S. Cl. ............................ 55/345; 55/346; 55/429; 55/DIG. 3; 15/353; 96/415; 96/416

(58) Field of Classification Search .................. 55/345, 55/346, DIG. 3, 429; 15/353; 96/415, 416, 96/325

See application file for complete search history.

(56) References Cited

U.S. PATENT DOCUMENTS

| | | | | |
|---|---|---|---|---|
| 2005/0252180 | A1* | 11/2005 | Oh et al. | 55/345 |
| 2006/0048487 | A1 | 3/2006 | Song et al. | 55/343 |
| 2006/0230724 | A1* | 10/2006 | Han et al. | 55/345 |

FOREIGN PATENT DOCUMENTS

| | | |
|---|---|---|
| CN | 2453827 | 10/2001 |
| DE | 20109699 | 10/2001 |
| DE | 102004055192 | 12/2005 |
| EP | 1774891 | 4/2007 |
| GB | 2426473 | 11/2006 |
| KR | 1020050025711 | 3/2005 |
| KR | 10-0554237 | 2/2006 |
| RU | 2261643 | 10/2005 |
| WO | WO 02/067755 | 9/2002 |
| WO | WO 02/067756 | 9/2002 |
| WO | 2006/038750 | 4/2006 |

OTHER PUBLICATIONS

Search Report dated Apr. 11, 2008 corresponding to European Patent Application No. 06291286.0.
Office Action dated Oct. 19, 2007 corresponding to Russian Patent Application No. 2006130411.
Extended Search Report dated Jun. 30, 2008 corresponding to European Patent Application No. 06291286.0.
Office Action dated Jun. 5, 2009 corresponding to Chinese Patent Application No. 200610115083.4.

* cited by examiner

*Primary Examiner*—Duane Smith
*Assistant Examiner*—Dung Bui
(74) *Attorney, Agent, or Firm*—Ohlandt, Greeley, Ruggiero & Perle, L.L.P.

(57) ABSTRACT

A multi-cyclone dust separating apparatus has a main cyclone comprising one or more cyclones, a sub cyclone comprising one or more cyclones, and being arranged around a part of the main cyclone in parallel relation, and a dust collecting casing provided to enclose the main and the sub cyclones, and collects dust as the dust is separated from the air in the main and the sub cyclones. At least a part of the dust collecting casing enclosing the main cyclone is formed in a half-circular shape.

22 Claims, 9 Drawing Sheets

MULTI-CYCLONE DUST SEPARATING APPARATUS

CROSS-REFERENCE TO RELATED APPLICATIONS

This application claims the benefit of Korean Patent Application No. 2005-102613, filed Oct. 28, 2005 in the Korean Intellectual Property Office, the disclosure of which is incorporated herein by reference.

BACKGROUND OF THE INVENTION

1. Field of the Invention

The present invention relates to a dust separating apparatus for use in a vacuum cleaner, which draws in air and dust from a surface being cleaned, separates dust from the air and discharges clean air. More particularly, the present invention relates to a multi-cyclone dust separating apparatus, which centrifuges dust from air by plurality of stages.

2. Description of the Related Art

Various types of dust separating apparatuses have been employed in vacuum cleaners. Among these, a cyclone type dust separating apparatus, which is easy to use and almost permanently usable, is rapidly replacing disposable dust bag or dust filter dust separating apparatuses. FIG. 1 is a perspective view of a canister type vacuum cleaner, which employs a cyclone type dust separating apparatus.

Referring to FIG. 1, a vacuum cleaner 10 generally includes a cleaner body 11 which is divided into a motor driving chamber 12 where a motor (not shown) is installed, and a cyclone mount chamber 13 where a cyclone dust separating apparatus 30 is installed, a suction nozzle 21, an extension hose 22, and a flexible hose 23. The vacuum cleaner 10 generates suction force by driving the motor (not shown), and draws in dust and air into the cleaner body 11 through the suction nozzle 21, extension hose 22, and flexible hose 23. The vacuum cleaner 10 then separates dust from the drawn-in air using the cyclone dust separating apparatus 30, and collects the separated dust. The clean air is discharged out via the motor driving chamber 12.

The cyclone dust separating apparatus 30 induces a whirling air current in the drawn-in air, and thus the dust is separated from the air by the centrifugal force of the whirling air. Meanwhile, the general practice is that a cyclone body 31 of the cyclone dust separating apparatus 30 is formed in cylindrical shape, and air inlet 33 and outlet (not shown) are provided near the upper end of the cyclone body 31. The air inlet 33 is in fluid communication with the flexible hose 23 via the inlet port 14, and the air outlet (not shown) is in fluid communication with the motor driving chamber 12 via an outlet port 15. A dustbin 32 is provided to the lower part of the cyclone body 31 to hold dust separated from the air, and is generally formed in a cylindrical shape to correspond to the shape of the cyclone body 31. In other words, a conventional cyclone dust separating apparatus 30 overall has a cylindrical configuration.

Accordingly, as shown in FIG. 2, a dead space S is generated between the cyclone dust separating apparatus 30 and the cyclone mount chamber 13 housing the cyclone dust separating apparatus 30. In order to corresponding to the shape of the motor, the motor driving chamber 12 is usually square in section, while the adjoined cyclone mount chamber 13 is approximately half circle in section. Because the cyclone dust separating apparatus 30 has cylindrical shape, such different shape of the cyclone mount chamber 13 and the cyclone dust separating apparatus 30 inherently causes one or more dead spaces S therebetween. Meanwhile, the cyclone dust separating apparatus 30 has a limited height to be employed in the cyclone mount chamber 13, and thus, the dustbin 32 has a limited height too. As a result, dust capacity is limited.

A multi-cyclone dust separating apparatus has recently been introduced, which filters dust by more than two stages and, thus, improves dust collecting efficiency. One example of such multi-cyclone dust separating apparatus is disclosed in WO02/067755 and WO02/067756 to Dyson Ltd. According to the above patents, upstream cyclone as the first cyclone and downstream cyclone as the second cyclone are arranged in vertical arrangement, which requires height of the cyclone dust separating apparatus to extend. This limits the application of the multi-cyclone dust collecting apparatus to upright type vacuum cleaners. In other words, the multi-cyclone dust separating apparatus cannot be efficiently applied to canister type vacuum cleaners for home use. Additionally, as the entire path for air of the cyclone dust collecting apparatus is long, loss of suction force increases.

In order to overcome such shortcomings of the conventional arts, the same Applicant as the present application has developed a multi-cyclone dust separating apparatus as disclosed in Korean Patent No. 0554237. In the above patent, the multi-cyclone dust separating apparatus is provided with a plurality of second cyclones, which are arranged around the first cyclone. Therefore, the overall height of the multi-cyclone dust separating apparatus decreases, and dust collecting efficiency increases. However, compacter vacuum cleaners are still required.

SUMMARY OF THE INVENTION

The present invention has been made to overcome the above-mentioned problems of the art, and therefore, it is an object of the present invention to provide an improved multi-cyclone dust separating apparatus capable of utilizing dead spaces in the cleaner body, and increasing dust collecting capacity of a small-size vacuum cleaner.

It is another object of the present invention to provide a multi-cyclone dust separating apparatus which has a compact size, but can provide improved dust collecting efficiency.

The above aspects and/or other features of the present invention can substantially be achieved by providing a multi-cyclone dust separating apparatus including a main cyclone comprising one or more cyclones, a sub cyclone comprising one or more cyclones, and being arranged around a part of the main cyclone in parallel relation, and a dust collecting casing provided to enclose the main and the sub cyclones, and collects dust as the dust is separated from the air in the main and the sub cyclones. At least a part of the dust collecting casing enclosing the main cyclone may be formed in a half-circular shape.

At least a part of the dust collecting casing enclosing the sub cyclone may be formed in a square shape with one side open.

The dust collecting casing comprises a first half-circular wall enclosing the main cyclone, a second wall enclosing the sub cyclone and connecting to one and the other ends of the first half-circular wall, and a third wall connecting the second wall.

The first half-circular wall may be formed of a transparent material.

The first, the second and the third walls may be formed integrally with each other.

The sub cyclone comprises a plurality of cyclone cones of different sizes.

The plurality of cyclone cones may be arranged along the inner circumference of the second and the third walls in a row.

The plurality of cyclone cones comprise one or more first cyclone cones, and one or more second cyclone cones in size smaller than the first cyclone cones.

The first and the second cyclone cones may each be formed in a conical configuration, which has narrower diameter toward the upper end, and the first cyclone cones have the same height as the main cyclone.

The main cyclone comprises a main air inlet at a lower end through which an external air is drawn, and a main air outlet at a lower end through which the air of the main cyclone is discharged.

The main air inlet and the main air outlet may be formed on the same plane.

The first and the second cyclone cones comprise first and second cone inlets at lower ends, through which the air discharged out of the main air outlet is branched off and drawn, with the first and the second cone inlets being formed such that entrance gates thereof being on the same plane.

The main air outlet of the main cyclone and the first and the second cone inlets of the firs and the second cyclones may be formed on the same plane.

The dust collecting casing comprises a partition for dividing the dust collecting chamber into a main chamber to collect the separated dust of the main cyclone, and a sub chamber to collect the separated dust of the sub cyclone.

An upper cover may be further provided for detachably connecting to the upper end of the dust collecting casing.

Upon mounting to the upper end of the dust collecting casing, the upper cover may form a dust outlet in cooperation with the upper end of the main cyclone, and comprise a backflow preventive member for preventing the dust of the main dust collecting chamber from flowing back into the main cyclone, and a sealing member connecting to the upper end of the partition and isolating the main dust collecting chamber from the sub dust collecting chamber.

A lower cover unit may be further provided, with being coupled to the lower end of the dust collecting casing to guide the air of the main cyclone into the sub cyclone. The lower cover unit includes an air inlet port for drawing in external air into the main cyclone, and an air outlet port for discharging the air of the sub cyclone to the outside.

According to one aspect of the present invention, a multi-cyclone dust separating apparatus includes a main cyclone for drawing in external air and separating dust from the drawn air using centrifugal force, the main cyclone comprising one or more cyclones, and a sub cyclone for drawing in the air discharged from the main cyclone and separating minute dust using centrifugal force. The sub cyclone comprises a plurality of cyclones, and at least one of the plurality of cyclones of the sub cyclone may have different size from the others.

Said one or more cyclones of the main cyclone and said one or more cyclones of the sub cyclone draw in the external air through the lower part, discharge dust of the drawn air through the upper part, and then discharge the dust-removed air through the lower part.

At least one of the cyclones of the sub cyclone may have the uppermost end of smaller diameter than the uppermost ends of the other cyclones.

At least one of the cyclones of the sub cyclone may be shorter than the others.

The main cyclone and the sub cyclone may be arranged in parallel, and said one or more cyclones of the main cyclone may be formed in substantially cylindrical configuration, and said one or more cyclones of the sub cyclone may be formed in a substantially conical configuration.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
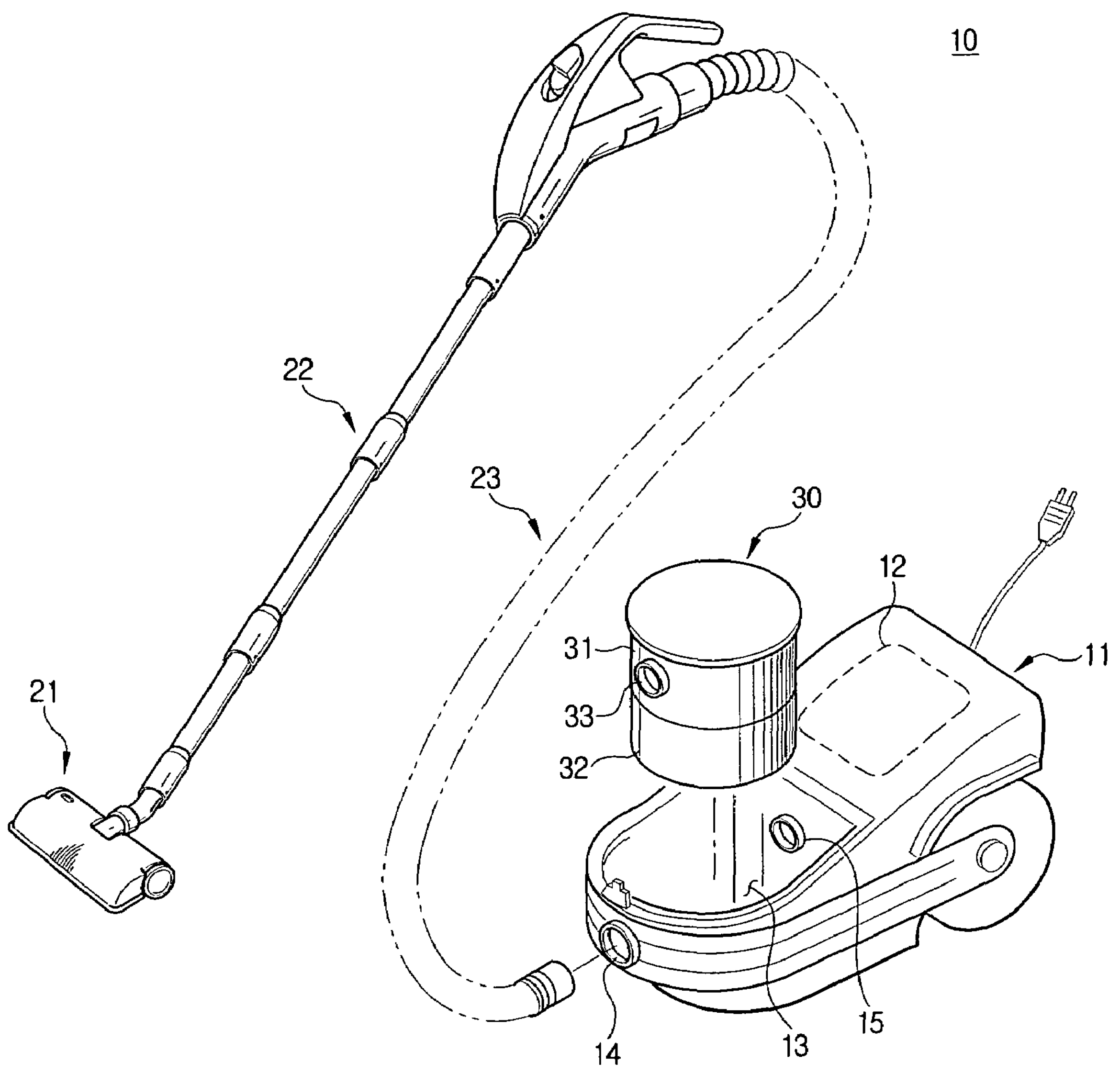
FIG. 1 (PRIOR ART)
FIG. 1 is a perspective view of a vacuum cleaner employing a conventional cyclone dust-separating apparatus.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
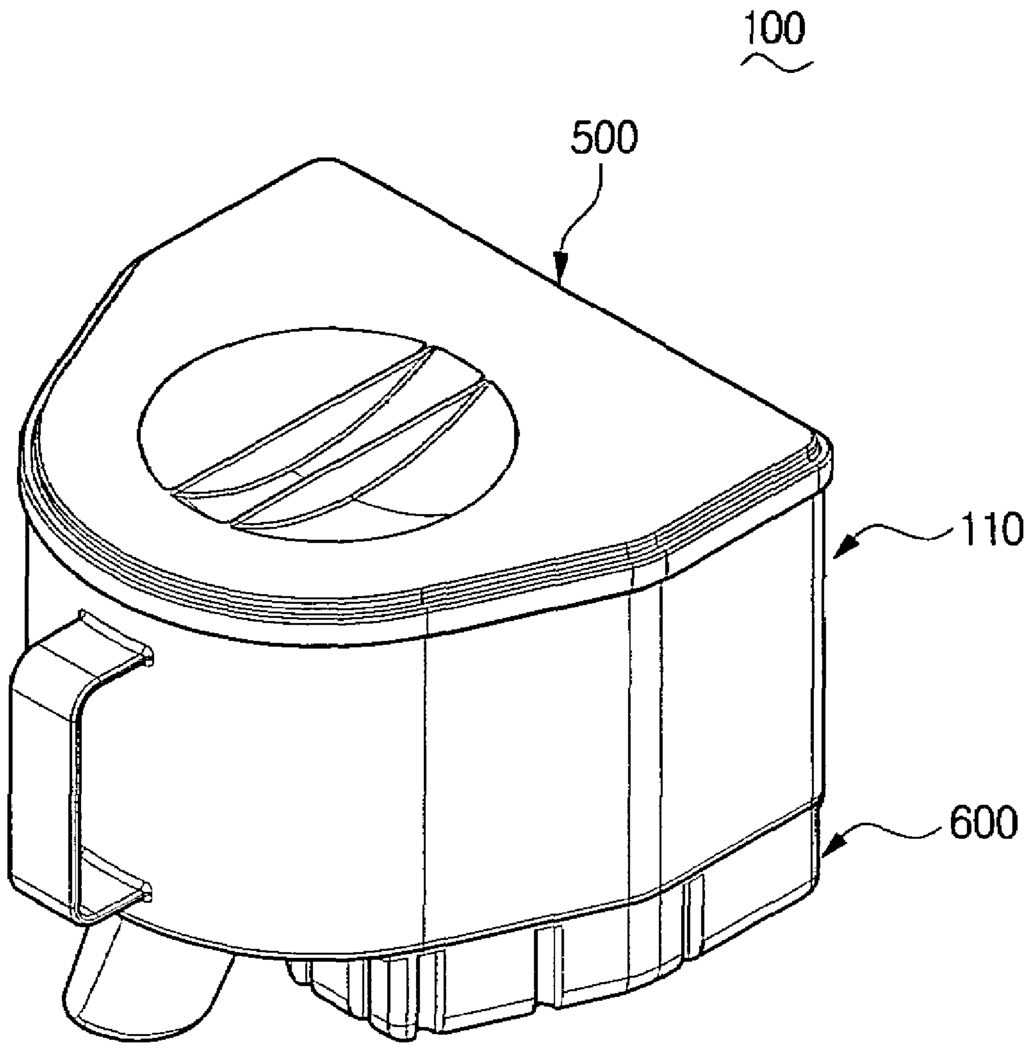
FIG. 3 is a perspective view of a multi-cyclone dust separating apparatus according to an embodiment of the present invention.
Figure 4:
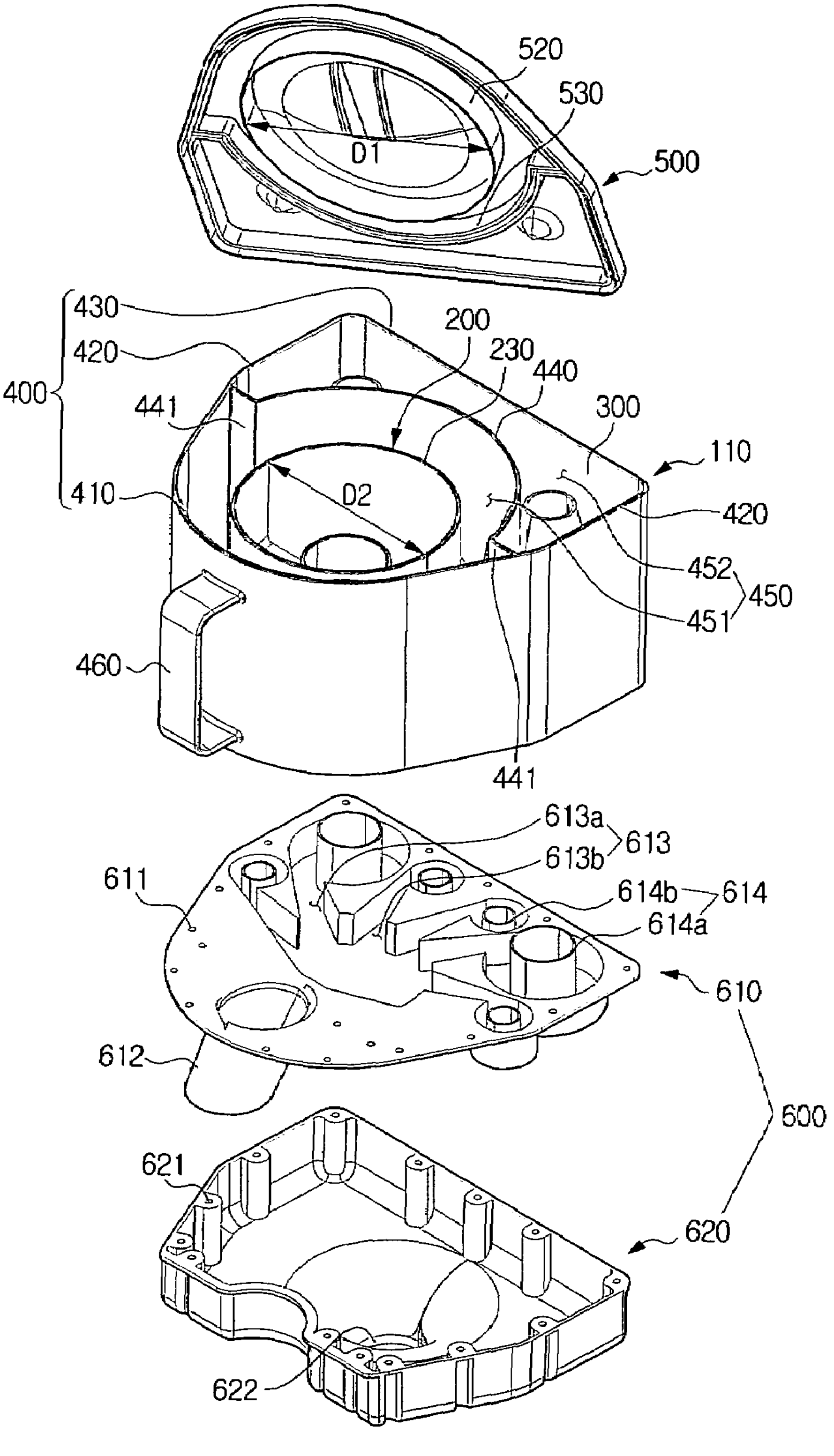
FIG. 4 is an exploded perspective view of the multi-cyclone dust separating apparatus of FIG. 3.

Referring to FIGS. 3 and 4, a multi-cyclone dust separating apparatus 100 includes a cyclone body 110, an upper cover 500, and a lower cover unit 600.

The cyclone body 110 includes a main cyclone 200, a sub cyclone 300, and a dust collecting casing 400. The main cyclone 200 centrifuges dust from the air drawn from outside. More specifically, the main cyclone 200 filters relatively large dust from the air. The sub cyclone 300 secondly centrifuges dust from the air drawn from the main cyclone 200. That is, the sub cyclone 300 filters relatively minute dust, which is too small to be filtered in the main cyclone 200. The dust collecting casing 400 forms the outer part of the cyclone body 110, and has a dust collecting chamber 450, which collects dust from the main cyclone 200 and the sub cyclone 300.

Figure 5:
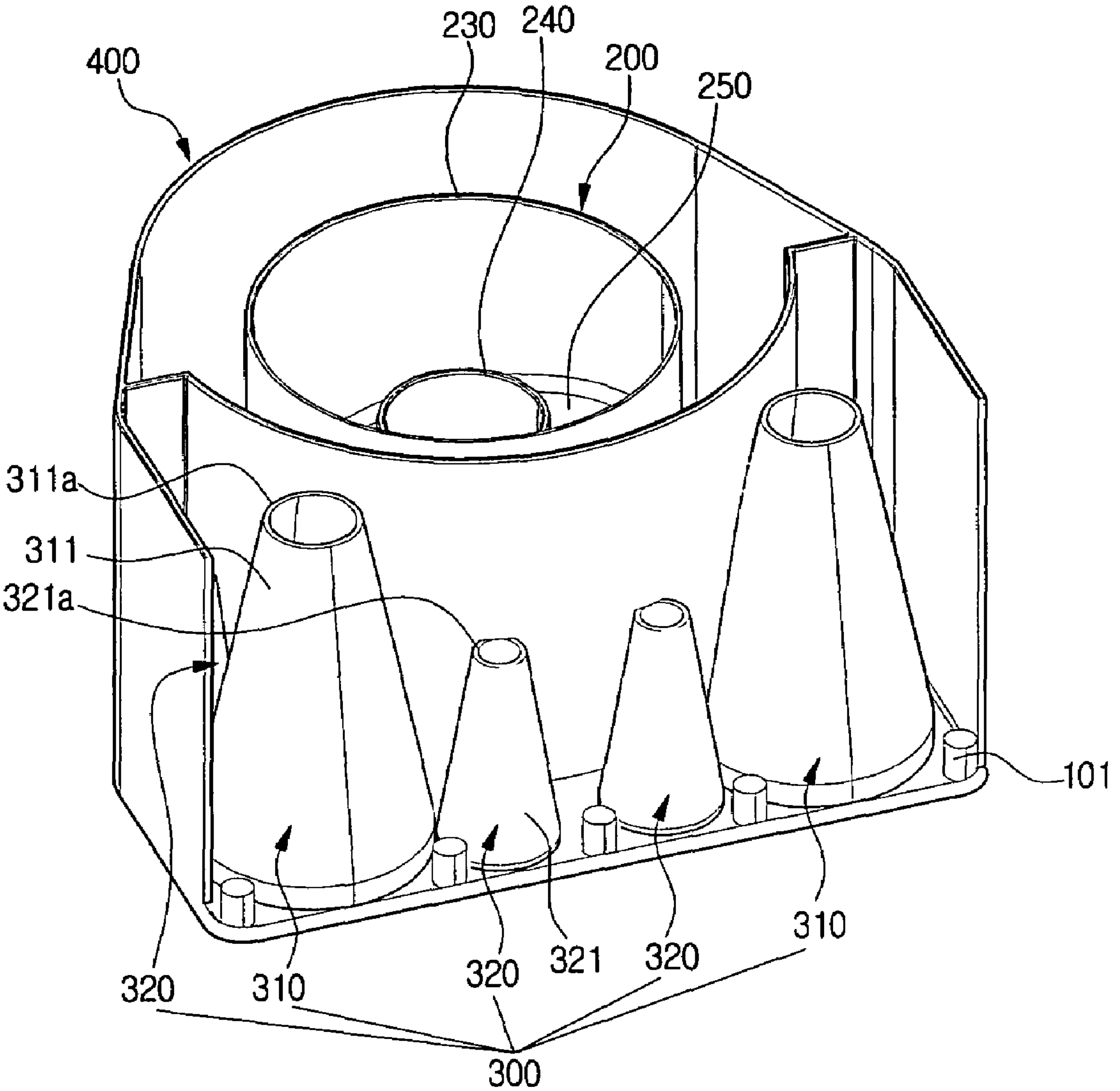
FIG. 5 is a perspective view showing a cyclone body in a partially-cut dust collecting casing of FIG. 4.
Figure 6:
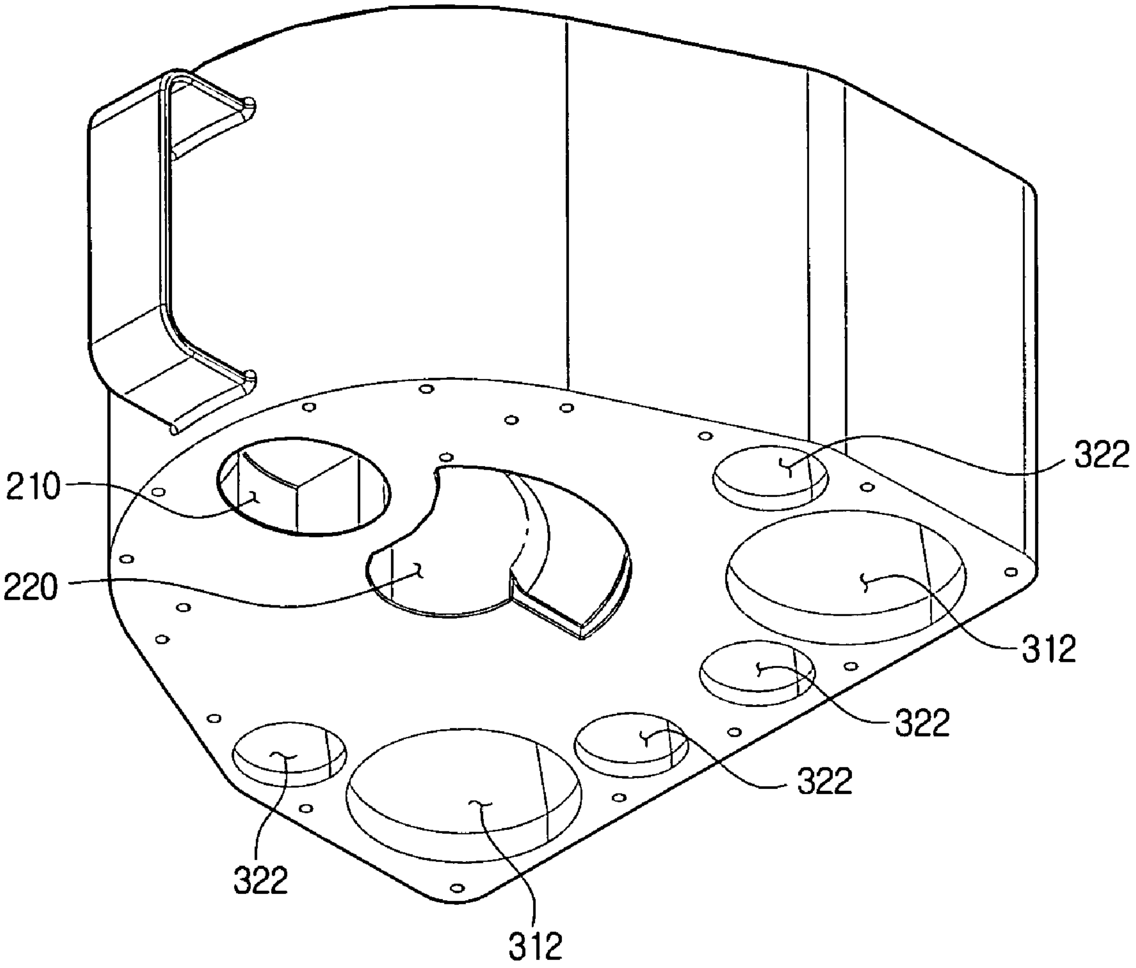
FIG. 6 is a bottom perspective view of the cyclone body of FIG. 5.

Referring to FIGS. 5 and 6, the main cyclone 200 includes a main air inlet 210, a main air outlet 220, and an outer chamber wall 230, which forms the cyclone chamber.

As shown, the main air inlet 210 and the main air outlet 220 are formed on the lower end of the main cyclone 200. The outer chamber wall 230 takes on a substantially cylindrical configuration to induce whirling air current from the drawn air containing dust, and has a slightly lower height than the dust collecting casing 400. An air outlet pipe 240 is formed approximately at the center of the outer chamber wall 230 and to a predetermined height. The air outlet pipe 240 is in fluid communication with the main air outlet 220. An upwardly inclining spiral air guide 250 is continuously formed along the outer side of the air outlet pipe 240 and along the inner side of the outer chamber wall 230 to induce upwardly moving air from the air drawn through the main air inlet 210. Accordingly, air drawn through the main air inlet 210 is guided along the upwardly inclining spiral air guide 250 to form an upwardly moving current. In this process, dust is separated from the air within the outer chamber wall 230 and the clean air is discharged out via the air outlet pipe 240 and the main air outlet 220.

As shown, the main cyclone 200 has, at its lower end, the main air inlet 210 and the main air outlet 220 in parallel relation with the main air inlet 210. Both the main air inlet 210 and the main air outlet 220 are on the same plane. According to one aspect of the present invention, the main cyclone 200 has the air drawing and discharging structure at its lower end.

One main cyclone 200 is employed in this particular embodiment of the present invention. However, one will understand that this should not be considered as limiting. For example, two cyclones may well be employed.

Referring to FIGS. 5 and 6, the sub cyclone 300 is arranged in parallel relation with the main cyclone 200, and includes at least one cyclone cone. It is more preferable to provide a plurality of cyclone cones, and still more preferable to have a plurality of cyclone cones of different sizes. The sub cyclone 300 includes one or more first cyclone cones 310, and one or more second cyclone cones 320. In this particular embodiment, there are two first cyclone cones 310 and four second cyclone cones 320 arranged. The second cyclone cone 320 has a smaller size than the first cyclone cone 310. The 'size' may refer to the height or diameter of the cyclone cone.

By arranging the first cyclone cones 310 and the second cyclone cones 320 of different sizes, and by properly arranging the first cyclone 310 and the second cyclone 320 according to the size or shape of the allowed space, dust collecting efficiency is improved and maximum space utilization can be provided.

Although not shown, a third cyclone cone, which is smaller in size than the second cyclone cone 320, may additionally be employed. In this particular embodiment of the present invention, there are four second cyclone cones 320 employed. However, the number of second cyclone cones 320 can be varied according to the shape or size of the dust collecting casing 400. For example, two second cyclone cones 320 and two third cyclone cones may be employed.

Both the first cyclone cone body 311 and the second cyclone cone body 321 are open at upper and lower ends, and each has the conical configuration, which has a gradually decreasing diameter toward the upper end 311*a*. First and second cone inlets 312 and 322 are formed on lower ends of the first cyclone body 311 and the second cyclone cone body 321, respectively. As shown, the first and the second cone inlets 312 and 322 may be formed on the approximately same plane. The air is discharged from the main air outlet 220 of the main cyclone 200, and distributed to enter through the first and the second cone inlets 312 and 322. The distributed air is drawn into the first and the second cyclone cones 310 and 320, respectively. The drawn air forms a whirling current inside the first and the second cyclone cones 310 and 320, thus shedding dust by the centrifugal force of the whirling air. The separated dust is discharged through the upper ends 311 a and 321 a of the first and second cyclone cone bodies 311 and 321, and clean air descends and flows out of the first and the second cyclone cones 310 and 320.

As shown, the first and the second cone inlets 312 and 322 are arranged on the same plane as the main air outlet 220 of the main cyclone 200. Accordingly, the shortest path of the air can be provided from the main cyclone 200 to the first and the second cyclone cones 310 and 320, respectively. As the path of air shortens, loss of suction force can be minimized.

Referring back to FIG. 4, the dust collecting casing 400 is arranged to surround the main cyclone 200 and the sub cyclone 300. The dust collecting casing 400 has a dust collecting chamber 450 which collects dust which is separated in the main cyclone 200 and the sub cyclone 300. The dust collecting chamber 450 includes a main dust collecting chamber 451 to receive dust which is separated in the main cyclone 200, and a sub dust collecting chamber 452 to receive dust, which is separated in the first and the second cyclone cones 310 and 320 of the sub cyclone 300.

The dust collecting casing 400 includes a first wall 410 extending around a part of the main cyclone 200 and forming a part of the main dust collecting chamber 451, a pair of second walls 420, and a third wall 430 extending around a part of the sub cyclone 300 and forming a part of the sub dust collecting chamber 452. The second and the third walls 420 and 430 may form an approximately square space therewithin that has one side open.

The first wall 410 is approximately half circle in section. A handle 460 may be formed on the outer side of the first wall. Each second wall 420 may be connected to an end of the first wall 410, and the third wall 430 may connect the second walls 420 to one another. Accordingly, the length of the third wall 430 is approximately same as the distance between one and the other ends of the first wall 410. The first wall 410, the second walls 420, and the third wall 430 may be formed integrally with each other for the convenience of manufacture.

The dust collecting casing 400 may include a partition 440 to divide the dust collecting chamber 450 therewithin into the main dust collecting chamber 451 and the sub dust collecting chamber 452. As a result, the main dust collecting chamber 451 is formed by the first wall 410 and the partition 440, and the sub dust collecting chamber 452 is formed by the second walls 420, the third wall 430 and the partition 440.

The partition 440 is a half circle in section and at a predetermined distance away from the outer chamber wall 230 of the main cyclone 200. Both ends 441 of the partition 440 are partially bent and connected to the first wall 410 for the convenience of assembly and manufacture. The main cyclone 200 filters relatively large particles of dust, while the sub cyclone 300 filters relatively minute particles of dust. Therefore, it is more advantageous to form the main dust collecting chamber 451 larger than the sub dust collecting chamber 452, and the partition 440 is formed to face the third wall 430.

Figure 7:
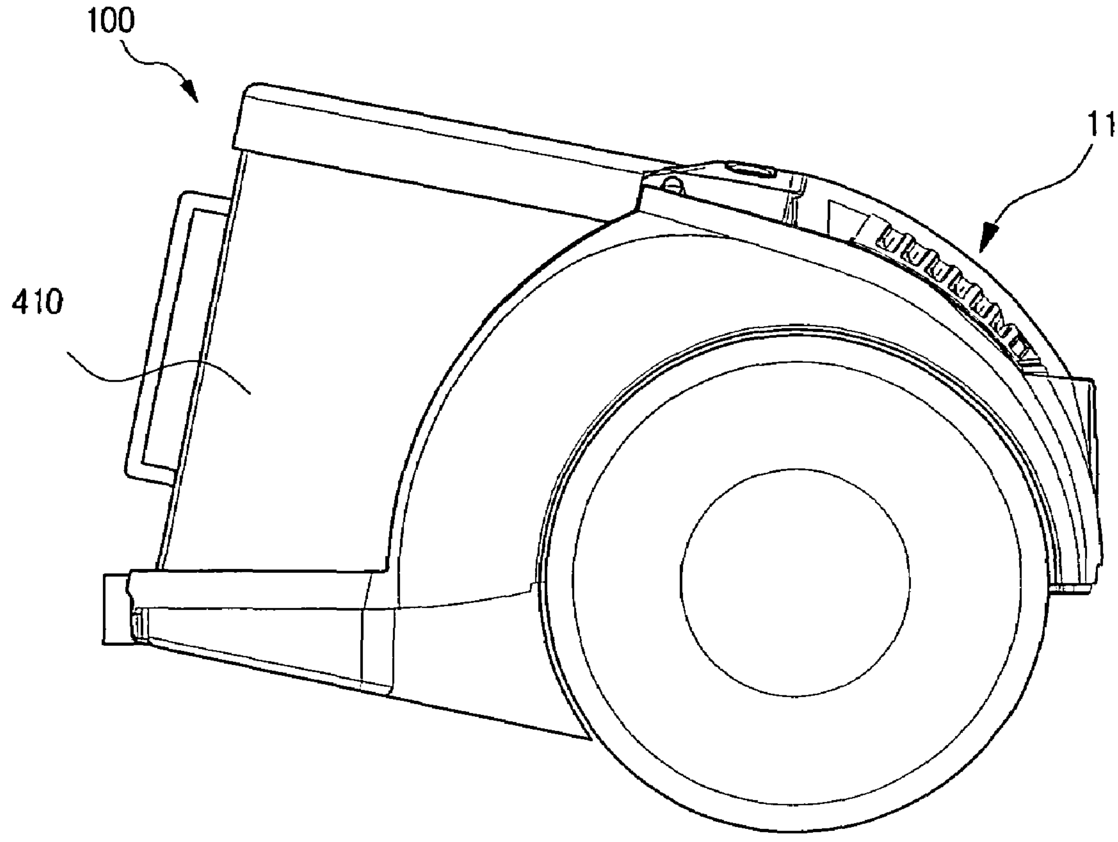
FIG. 7 is a perspective view of a vacuum cleaner body employing a multi-cyclone dust separating apparatus according to an embodiment of the present invention.

Referring to FIG. 7, when the multi-cyclone dust separating apparatus 100 is mounted on the vacuum cleaner body 11, the first wall 410 is exposed to the outside. At least the first wall 410 of the dust collecting casing 400 is preferably formed of a transparent material so that the user can observe the interior of the main dust collecting chamber 451 (see FIG. 4) through the first wall 410. As mentioned above, because the main cyclone 200 filters most of dust excluding minute dust, the main dust collecting chamber 451 frequently gets full. Therefore, a user feels convenient as he can check the amount of collected dust without having to separate the multi-cyclone dust separating apparatus 100 from the vacuum cleaner body 11.

Figure 2:
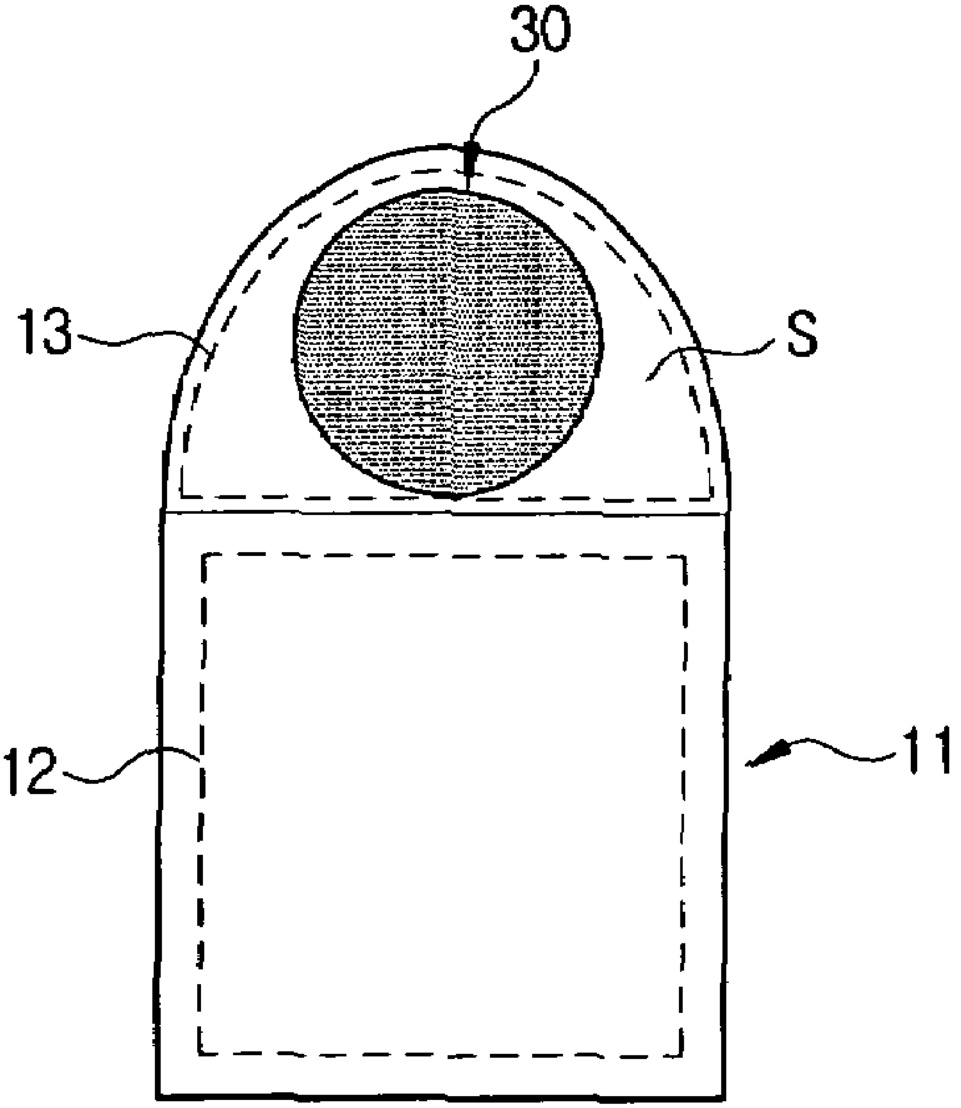
FIG. 2 (PRIOR ART)
FIG. 2 is a schematic top plan view of a body of the vacuum cleaner of FIG. 1.

As mentioned above, by the dust collecting casing 400 of half circle section which corresponds to the mount chamber of the vacuum cleaner body 11, and by arranging the main cyclone 200, the sub cyclone 300 and the dust collecting chamber 450 in parallel to each other inside the dust collecting casing, the dust collecting chamber 450 can have improved dust collecting efficiency, and the overall height of the multi-cyclone dust separating apparatus 100 decreases. As shown in FIG. 1, a conventional cyclone dust separating apparatus 30 has a dustbin 32 at the lower end of the cyclone body 31 and thus has a limit in its dust collecting capacity. According to one aspect of the present invention, the dust collecting casing 400 is formed to have a half circle shape in section, thus removing dead spaces S (see FIG. 2) in the dust collecting chamber 13 of the vacuum cleaner body, and the first dust collecting chamber 451 can replace the dead spaces S. Accordingly, while maintaining the size of the vacuum cleaner 11 as designed, the dust collecting capacity of the dust collecting chamber 450, and particularly, the capacity of the first dust collecting chamber 451 increases. Additionally, by arranging the dust collecting chamber 450 in parallel relation with the cyclones 200 and 300, the overall height can reduce, and as a result, compact multi-cyclone dust separating apparatus 100 can be provided. By providing a compact multi-cyclone dust separating apparatus 100, the vacuum cleaner of compact size can be provided.

Furthermore, by arranging a plurality of first and second cyclone cones 320 and 330 of different sizes according to the configuration of the interior space of the dust collecting casing 400, maximum space utilization can be provided and dust collecting efficiency can improve.

Referring again to FIG. 4, the upper cover 500 is detachably coupled to the upper end of the dust collecting casing 400. To repair the inside of the dust collecting casing 400 or to empty the dust collecting chamber 450, the user is simply required to separate the upper cover 500. Meanwhile, the height of the upper end of the outer chamber wall 230 lower than the height of the upper end of the dust collecting casing 400. Accordingly, when the upper cover 500 is connected to the upper end of the dust collecting casing 400, a dust outlet 510 (see FIG. 8) is defined between the inner side of the upper cover 500 and the upper end of the outer chamber wall 230.

A backflow preventive member 520 protrudes from the inner side of the upper cover 500 to a predetermined length, to prevent dust collected in the first dust collecting chamber 451 from flowing backward into the outer chamber wall 230. The backflow preventive member 520 has a diameter D1 longer than that D2 of the outer chamber wall 230. Additionally, a sealing member 50 protrudes from the inner side of the upper cover 500 to a predetermined length to sealingly separate the sub dust collecting chamber 452 from the main dust collecting chamber 451.

The lower cover unit 600 includes a guide cover 610 and a discharge cover 620. The discharge cover 620 is coupled to the lower end of the dust collecting casing 400 by fasteners such as screws, with the guide cover 610 therebetween. For screw coupling, coupling bosses 621 (see FIG. 4) and 101 (see FIG. 5) are formed in the discharge cover 620 and the dust collecting casing 400, and the guide cover 610 has a screw hole 611 to receive screw therein.

The guide cover 610 has an air suction port 612 in one side, in fluid communication with the main air inlet 210 (see FIG. 6) of the main cyclone 200. The air suction port 612 is in fluid communication with the suction nozzle 21 (see FIG. 1) of the vacuum cleaner 10. The guide cover 610 has, on its other end, an inlet guide path 613 in fluid communication with the main air outlet 220 (see FIG. 6) of the main cyclone 200, and with the first and the second cone inlets 312 and 322 (see FIG. 6) of the first and the second cyclone cones 310 and 320, respectively. The inlet guide path 613 includes a first inlet guide path 613*a* in fluid communication with the first cone inlet 312 of the first cyclone cone 310, and a second inlet guide path 613*b* in fluid communication with the second cone inlet 322 of the second cyclone cone 320. Each of the inlet guide paths 613*a* and 613*b* has a spiral section to guide air from the main air outlet 220 into each of the first and the second cyclone cones 310 and 320 in a whirling current. An outlet guide path 614 has a tubular form of a predetermined length, and through the outlet guide path 614, clean air is discharged from the first and the second cyclone cones 310 and 320. In order to prevent the drawn dust-laden air from mixing with the clean air inside the cyclone cones 310 and 320, a part of upper end of the outlet guide path 614 is inserted in the first and the second cyclone cones 310 and 320, respectively. The outlet guide path 614 includes a first outlet guide path 614*a* through which the air of the first cyclone cone 310 is discharged, and a second outlet guide path 614*b* through which the air of the second cyclone cone 320 is discharged.

The discharge cover 620 includes an air outlet port 622 which gathers air from the plurality of first and second outlet guide paths 614*a* and 614*b* and discharges the air out of the multi-cyclone dust separating apparatus 100. The air outlet port 622 is in fluid communication with the motor driving chamber 12 (see FIG. 1) of the vacuum cleaner 10. The motor driving chamber 12 houses a vacuum source therein, and accordingly, the suction force of the vacuum source is transmitted to the suction nozzle 21 (see FIG. 1) via the air outlet port 622 and the air inlet port 612.

Figure 8:
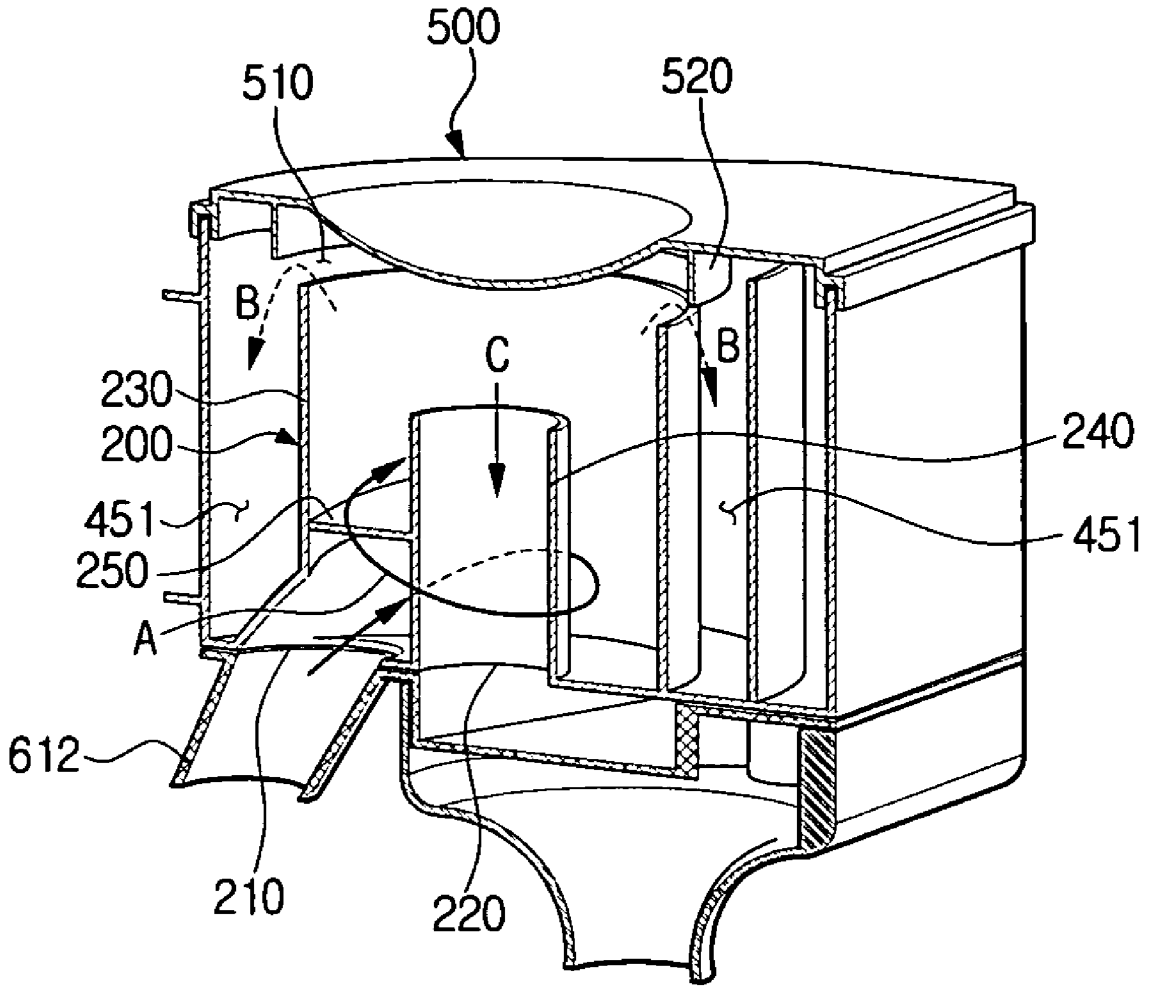
FIGS. 8 and 9 are partially-cut views of a multi-cyclone dust separating apparatus to explain the operations according to an embodiment of the present invention.

Hereinbelow, the operation and effect of the multi-cyclone dust separating apparatus according to an embodiment of the present invention will be described with reference to FIGS. 8 and 9. FIG. 8 is a partially cut view to show the air path of the main cyclone 200, and FIG. 9 is a partially cut view to show the air path from the main cyclone 200 to the sub cyclone 300.

Referring to FIG. 8, when the electricity is supplied to the vacuum cleaner and suction force is generated, dust of the surface being cleaned is drawn with air through the suction nozzle 21 (see FIG. 1), and passes through the air inlet port 312 and the main air outlet 210 to flow into the main cyclone 200.

The drawn air and dust is guided along the air guide 250 in the direction of arrow A, and ascends inside the outer chamber wall 230 in a whirling current. At this time, as being heavier than the air, dust in the drawn air is particularly gathered toward the inner side of the outer chamber wall 230, and then entrained in the ascending air current to be thrown out through the dust outlet 510 as indicated by the arrow B. The dust is then piled in the first dust collecting chamber 451. Dust in the dust collecting chamber 451 cannot flow back into the outer chamber wall 230 due to the presence of the backflow preventive member 520. The clean air, from which relatively large dust has been removed, collides against the inner side of the upper cover 500 and descends, and exits out of the main air outlet 220 via the air outlet pipe 240 as indicated by the arrow C.

Figure 9:
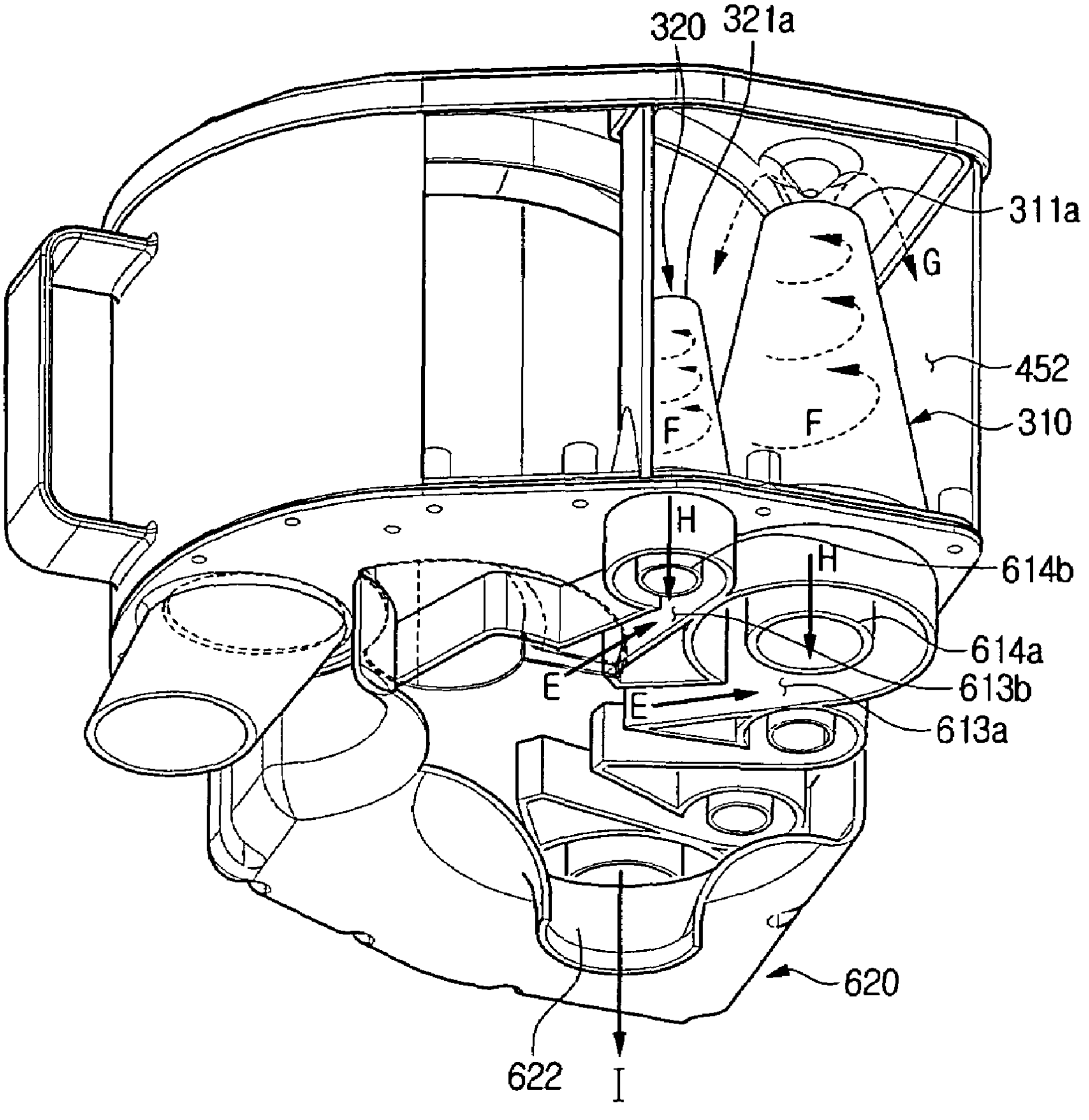

Referring to FIG. 9, air discharged from the main air outlet 220 is branched off to be then guided along the first and the second inlet guide paths 613*a* and 613*b* as indicated by the arrow E. Accordingly, the air is drawn into the first and the second cyclone cones 310 and 320 through the first and the second cone inlets 312 and 322 (see FIG. 6). The air then ascends inside the first and the second cyclone cones 310 and 320 in a whirling current as indicated by the arrow F. Minute dust is separated from the air by the centrifugal force, drawn toward the inner wall of the first and the second cyclone cones 310 and 320, lifted in the ascending air current, thrown through the upper ends 311*a* and 311*b* of the body as indicated by the arrow G, and piled in the sub dust collecting chamber 452. The clean air descends by the suction force, guided along the first and the second outlet paths 614*a* and 614*b*, and discharged out of the first and the second cyclone cones 310 and 320 as indicated by arrow H. Air discharged from the first and the second cyclone cones 310 and 320 is gathered in the interior space of the discharge cover 620 and exits out of the multi-cyclone dust separating apparatus 100 through the air outlet port 622 as indicated by the arrow I.

As explained above with reference to a few exemplary embodiments of the present invention, the multi-cyclone dust separating apparatus according to the present invention is provided with not only reduced height but also increased dust collecting capacity of the dust collecting chamber by arranging the dust collecting casing in a half-circular configuration to correspond to the mount chamber of the cleaner body and arranging the main and sub cyclones and the dust collecting chamber in parallel inside the dust collecting casing. Accordingly, dead space can be removed from the cleaner body where the multi-cyclone dust separating apparatus is mounted, and by replacing the dead spaces with the dust collecting chamber, much increased dust collecting capacity can be provided within the limited structure. Furthermore, the multi-cyclone dust separating apparatus can be compact-sized, which will eventually bring in compact vacuum cleaner.

Additionally, because one or more first and second cyclones of different sizes are arranged in shapes or sizes corresponding to those of the interior of the dust collecting chamber, cyclone cones of different sizes of small cyclone cones can be arranged in the dead spaces, both the maximum space utilization and the improved dust collecting efficiency can be provided.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A multi-cyclone dust separating apparatus comprising:

a main cyclone comprising one or more cyclones;

a sub cyclone comprising one or more cyclones, the sub cyclone being arranged around a part of the main cyclone and being arranged in parallel relation to the main cyclone; and a dust collecting casing provided to enclose the main and the sub cyclones, the dust collecting casing collecting dust as the dust is separated from air in the main and the sub cyclones, the dust collecting casing having at least a first part enclosing the main cyclone, wherein the first part is formed in a half-circular shape.

2. The multi-cyclone dust separating apparatus of claim 1, wherein the dust collecting casing has at least a second part enclosing the sub cyclone, the second part being formed in a square shape with one side open.

3. The multi-cyclone dust separating apparatus of claim 2, wherein the first part comprises a first half-circular wall enclosing the main cyclone, the second part comprises a pair of second walls enclosing the sub cyclone and connecting to opposite ends of the first half-circular wall, and the second part comprises a third wall connecting the pair of second walls to one another.

4. The multi-cyclone dust separating apparatus of claim 3, wherein the first half-circular wall is formed of a transparent material.

5. The multi-cyclone dust separating apparatus of claim 3, wherein the first, the second and the third walls are formed integrally with each other.

6. The multi-cyclone dust separating apparatus of claim 3, wherein the sub cyclone comprises a plurality of cyclone cones of different sizes.

7. The multi-cyclone dust separating apparatus of claim 6, wherein the plurality of cyclone cones are arranged along an inner circumference of the second and the third walls in a row.

8. The multi-cyclone dust separating apparatus of claim 6, wherein the plurality of cyclone cones comprise one or more first cyclone cones and one or more second cyclone cones, the one or more second cyclone cones being smaller in size than the one or more first cyclone cones.

9. The multi-cyclone dust separating apparatus of claim 8, wherein the one or more first and second cyclone cones are each formed in a conical configuration having a narrower diameter toward an upper end, and wherein the one or more first cyclone cones have a height that is the same as the main cyclone.

10. The multi-cyclone dust separating apparatus of claim 9, wherein the main cyclone comprises a main air inlet at a lower end through which an external air is drawn, and a main air outlet at a lower end through which the air of the main cyclone is discharged.

11. The multi-cyclone dust separating apparatus of claim 10, wherein the main air inlet and the main air outlet are formed on the same plane.

12. The multi-cyclone dust separating apparatus of claim 11, wherein the one or more first and second cyclone cones comprise first and second cone inlets at lower ends, through which the air discharged out of the main air outlet is branched off and drawn, with the first and the second cone inlets being formed such that entrance gates thereof are on the same plane.

13. The multi-cyclone dust separating apparatus of claim 12, wherein the main air outlet of the main cyclone and the first and the second cone inlets of the first and the second cyclone cones are formed on the same plane.

14. The multi-cyclone dust separating apparatus of claim 1, wherein the dust collecting casing comprises a partition for dividing the dust collecting chamber into a main chamber to collect the separated dust of the main cyclone, and a sub chamber to collect the separated dust of the sub cyclone.

15. The multi-cyclone dust separating apparatus of claim 14, further comprising an upper cover for detachably connecting to an upper end of the dust collecting casing.

16. The multi-cyclone dust separating apparatus of claim 15, wherein, upon mounting to the upper end of the dust collecting casing, the upper cover forms a dust outlet in cooperation with an upper end of the main cyclone, and the upper cover comprising:

a backflow preventive member for preventing the dust of the main dust collecting chamber from flowing back into the main cyclone, and a sealing member connecting to an upper end of the partition and isolating the main dust collecting chamber from the sub dust collecting chamber.

17. The multi-cyclone dust separating apparatus of claim 16, further comprising a lower cover unit coupled to a lower end of the dust collecting casing to guide the air of the main cyclone into the sub cyclone, the lower cover unit comprising:

an air inlet port for drawing in external air into the main cyclone, and an air outlet port for discharging the air of the sub cyclone to the outside.

18. A multi-cyclone dust separating apparatus comprising:

a main cyclone for drawing in external air and separating dust from the drawn air using centrifugal force, the main cyclone comprising one or more cyclones; and a sub cyclone for drawing in air discharged from the main cyclone and separating minute dust using centrifugal force, the sub cyclone comprising a plurality of cyclones, at least one of the plurality of cyclones of the sub cyclone has a different size from others of the plurality of cyclones of the sub cyclone, wherein said one or more cyclones of the main cyclone are formed in substantially cylindrical configuration, and said plurality of cyclones of the sub cyclone are formed in a substantially conical configuration.

19. A multi-cyclone dust separating apparatus comprising:

a main cyclone for drawing in external air and separating dust from the drawn air using centrifugal force, the main cyclone comprising one or more cyclones; and a sub cyclone for drawing in air discharged from the main cyclone and separating minute dust using centrifugal force, the sub cyclone comprising a plurality of cyclones, at least one of the plurality of cyclones of the sub cyclone has a different size from others of the plurality of cyclones of the sub cyclone, wherein said one or more cyclones of the main cyclone and said plurality of cyclones of the sub cyclone draw in the air through a lower part, discharge dust of the air through an upper part, and then discharge the dust-removed air through the lower part.

20. The multi-cyclone dust separating apparatus of claim 19, wherein at least one of the plurality of cyclones of the sub cyclone has an uppermost end of smaller diameter than an uppermost ends of the others.

21. The multi-cyclone dust separating apparatus of claim 19, wherein at least one of the plurality of cyclones of the sub cyclone is shorter than the others.

22. The multi-cyclone dust separating apparatus of claim 18, wherein the main cyclone and the sub cyclone are arranged in parallel.

* * * * *